(12) United States Patent
Schmidt

(10) Patent No.: US 11,141,879 B2
(45) Date of Patent: Oct. 12, 2021

(54) FUNCTIONAL INORGANICS AND CERAMIC ADDITIVE MANUFACTURING

(71) Applicant: Raytheon Technologies Corporation, Farmington, CT (US)

(72) Inventor: Wayde R. Schmidt, Pomfret Center, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/983,280

(22) Filed: Aug. 3, 2020

(65) Prior Publication Data

US 2020/0361116 A1 Nov. 19, 2020

Related U.S. Application Data

(60) Continuation of application No. 16/387,115, filed on Apr. 17, 2019, now Pat. No. 10,730,204, which is a division of application No. 14/882,951, filed on Oct. 14, 2015, now Pat. No. 10,300,624.

(60) Provisional application No. 62/065,324, filed on Oct. 17, 2014.

(51) Int. Cl.
| | | |
|---|---|---|
| *B32B 3/00* | (2006.01) | |
| *B32B 7/00* | (2019.01) | |
| *B32B 17/00* | (2006.01) | |
| *C08F 2/46* | (2006.01) | |
| *C08F 2/50* | (2006.01) | |
| *C08G 61/04* | (2006.01) | |
| *B28B 1/00* | (2006.01) | |
| *C04B 35/571* | (2006.01) | |
| *C04B 35/628* | (2006.01) | |
| *B29C 64/135* | (2017.01) | |
| *C08K 9/04* | (2006.01) | |
| *B29C 35/04* | (2006.01) | |
| *B29C 35/08* | (2006.01) | |
| *B33Y 10/00* | (2015.01) | |
| *B33Y 30/00* | (2015.01) | |
| *B33Y 70/00* | (2020.01) | |

(52) U.S. Cl.
CPC ............ *B28B 1/001* (2013.01); *B29C 64/135* (2017.08); *C04B 35/571* (2013.01); *C04B 35/62802* (2013.01); *C08K 9/04* (2013.01); *B29C 35/045* (2013.01); *B29C 35/0805* (2013.01); *B29C 2035/0827* (2013.01); *B29C 2035/0855* (2013.01); *B33Y 10/00* (2014.12); *B33Y 30/00* (2014.12); *B33Y 70/00* (2014.12); *C04B 2235/6026* (2013.01); *C04B 2235/665* (2013.01)

(58) Field of Classification Search
CPC . B28B 1/001; C04B 35/571; C04B 35/62802; C04B 2235/6026; C04B 2235/665; C08K 9/04; B29C 64/135; B29C 35/045; B29C 35/0805; B29C 2035/0855; B29C 2035/0827; B33Y 30/00; B33Y 10/00; B33Y 70/00
USPC ..... 428/210, 195.1, 98; 522/6, 71, 189, 184, 522/1; 520/1
See application file for complete search history.

(56) References Cited

U.S. PATENT DOCUMENTS

| 5,711,987 A * | 1/1998 | Bearinger ............ H01L 23/296 427/7 |
|---|---|---|
| 6,228,437 B1 | 5/2001 | Schmidt |
| 7,722,802 B2 | 5/2010 | Pfeifer et al. |
| 8,636,496 B2 | 1/2014 | Das et al. |
| 9,403,726 B2 | 8/2016 | Fischer et al. |
| 2005/0059757 A1* | 3/2005 | Bredt ................ B33Y 10/00 524/3 |
| 2006/0141154 A1 | 6/2006 | Thebault |
| 2007/0072762 A1 | 3/2007 | Neil et al. |
| 2010/0025874 A1 | 2/2010 | Apel et al. |
| 2012/0201736 A1 | 8/2012 | Aoki |
| 2013/0224471 A1 | 8/2013 | Sheedy et al. |
| 2014/0183799 A1 | 7/2014 | Fischer et al. |
| 2016/0107331 A1 | 4/2016 | Schmidt |
| 2019/0240863 A1 | 8/2019 | Schmidt |

FOREIGN PATENT DOCUMENTS

| EP | 2487144 A1 | 8/2012 |
|---|---|---|
| JP | 2010189265 A | 9/2010 |
| WO | 02055451 A1 | 7/2002 |
| WO | 03016030 A1 | 2/2003 |

OTHER PUBLICATIONS

Bernardo et al, Advanced Ceramics from preceramic polymers modified at the nano-scale: a review, Mar. 6, 2014, Materials, 7, 1927-1956 (Year: 2014).*
Chen Chao-hui et al, Changsha: Press of National University of Defense Technology, Sep. 2003, p. 12.
European Search Report for Application No. 15190461.2-1371; dated Mar. 9, 2016; 8 pgs.
Jakubenas et al., Journal of the American Ceramic Society, 78 [8] 2263-66.

(Continued)

*Primary Examiner* — Jessica Whiteley
(74) *Attorney, Agent, or Firm* — Cantor Colburn LLP

(57) ABSTRACT

The present disclosure relates to systems, methods and resins for additive manufacturing. In one embodiment, a method for additive manufacturing of a ceramic structure includes providing a resin including a preceramic polymer and inorganic ceramic filler particles dispersed in the preceramic polymer. The preceramic polymer is configured to convert to a ceramic phase. The method includes functionalizing inorganic ceramic filler particles with a reactive group and applying an energy source to the resin to create at least one layer of the ceramic phase from the resin.

19 Claims, 3 Drawing Sheets

(56) References Cited

OTHER PUBLICATIONS

China Examination Report for China Application No. 201510674032.4, Application Filing Date: Oct. 16, 2015; dated Aug. 27, 2020; with English Translation dated Sep. 3, 2020, 10 pages.
China Decision on Appeal for China Application No. 201510674032.4; Application Filing Date: Oct. 16, 2015; Date of Notification: Dec. 2, 2020; 8 pages.

* cited by examiner

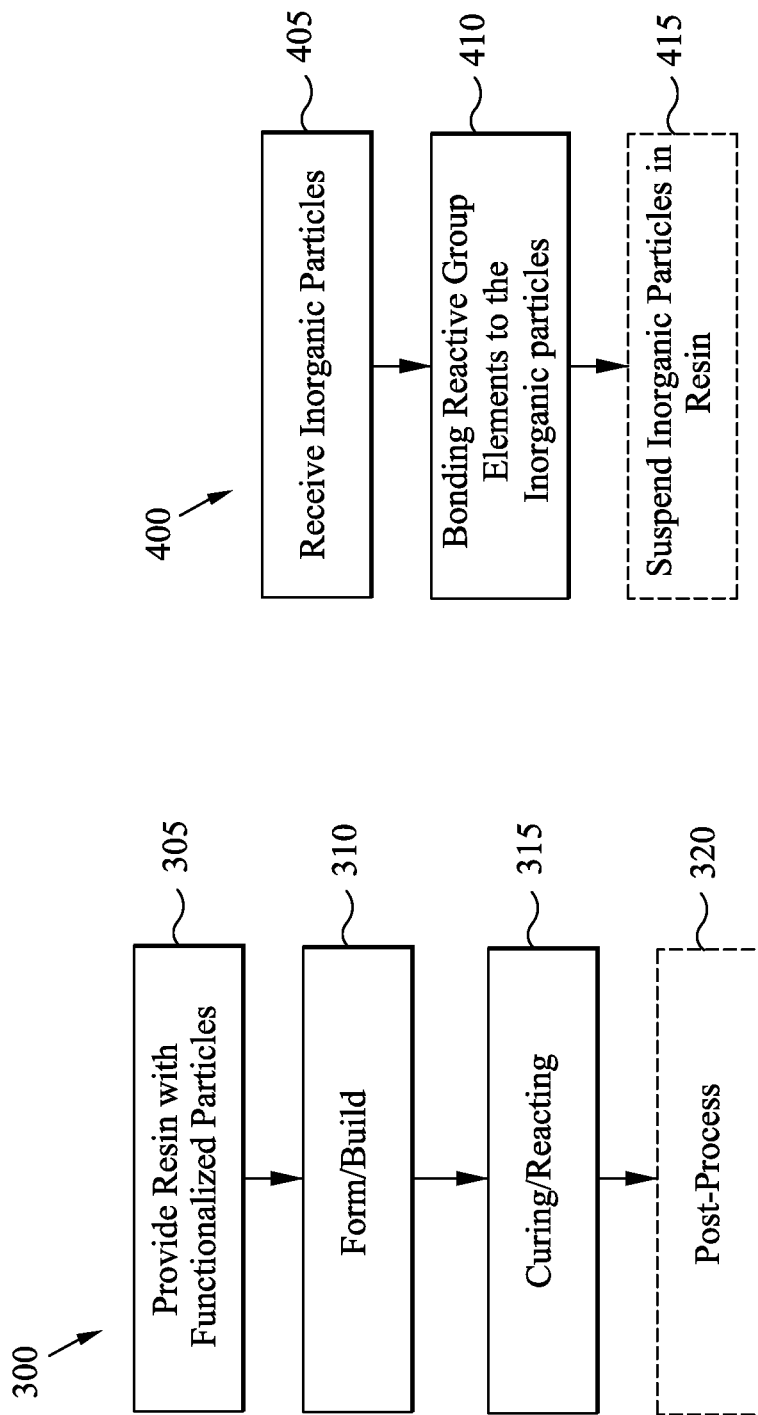

FUNCTIONAL INORGANICS AND CERAMIC ADDITIVE MANUFACTURING

CROSS REFERENCE TO RELATED APPLICATIONS

This application is a continuation of U.S. application Ser. No. 16/387,115 filed on Apr. 17, 2019 which is a division of U.S. application Ser. No. 14/882,951 filed Oct. 14, 2015, which claims the benefit of U.S. Provisional Patent Application Ser. No. 62/065,324 filed Oct. 17, 2014, all of which are incorporated by reference in their entirety herein.

BACKGROUND

The present disclosure relates to additive manufacturing and, more particularly, to systems, methods and resins for additive manufacturing of ceramic phase structures.

Fabrication of ceramic parts for high-temperature applications using conventional methods is difficult. By way of example, some materials are difficult and expensive to machine due to hardness. Machining can require extended periods of time for dense materials. In addition, it may be especially challenging to use conventional methods to provide complex geometries and similarly to produce particular shapes.

There is a need for systems and methods of preparing components from dense material and similarly for producing components of high temperature applications.

BRIEF DESCRIPTION

Disclosed and claimed herein are systems, methods and resins for additive manufacturing of ceramic structures. One embodiment is directed to a method for additive manufacturing of a ceramic structure, the method including providing a resin, the resin including a preceramic polymer and inorganic ceramic filler particles dispersed in the preceramic polymer, wherein the preceramic polymer is configured to convert to a ceramic phase, and wherein the inorganic ceramic filler particles are functionalized with a reactive group and configured to convert to the ceramic phase. The method also includes applying an energy source to the resin to create at least one layer of the ceramic phase from the resin.

In one embodiment, the preceramic polymer is polycarbosilane.

In one embodiment, the ceramic phase is silicon carbide.

In one embodiment, the inorganic ceramic filler particles are functionalized with a reactive group.

In one embodiment, the energy source is a laser source for curing at least one of the preceramic polymer and ceramic filler particles.

In one embodiment, the resin is provided in a bath for additive manufacturing.

In one embodiment, the inorganic ceramic filler particles include functional groups configured to decompose and a ceramic phase, wherein the ceramic phase remains during fabrication.

In one embodiment, applying an energy source to the resin includes free form fabrication of a three-dimensional article formed of silicon carbide.

The method further includes processing an article formed by the layer and one or more additional layers by at least one of thermal, plasma, microwave and radiative curing, and curing methods in general.

Another embodiment is directed to a system for additive manufacturing of ceramics, the system including a bath configured to contain a resin, the resin including a preceramic polymer and inorganic ceramic filler particles dispersed in the preceramic polymer. The preceramic polymer is configured to convert to a ceramic phase, and the inorganic ceramic filler particles are functionalized with a reactive group and configured to convert to the ceramic phase. The system also includes an energy source proximate to the bath, and a controller coupled to the energy source and configured to apply the energy source to the resin to create at least one layer of the ceramic phase from the resin.

Another embodiment is directed to a resin for additive manufacturing of ceramics, the resin including a preceramic polymer wherein the preceramic polymer is configured to convert to a ceramic phase and inorganic ceramic filler particles dispersed in the preceramic polymer, wherein the inorganic ceramic filler particles are functionalized with a reactive group and configured to convert to the ceramic phase.

In one embodiment, the ceramic phase is silicon carbide

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 3 depicts a process for additive manufacturing according to one or more embodiments; and FIG. 4 depicts a process for providing functionalizing particles according to one or more embodiments.

DETAILED DESCRIPTION

Overview and Terminology

Figure 1:
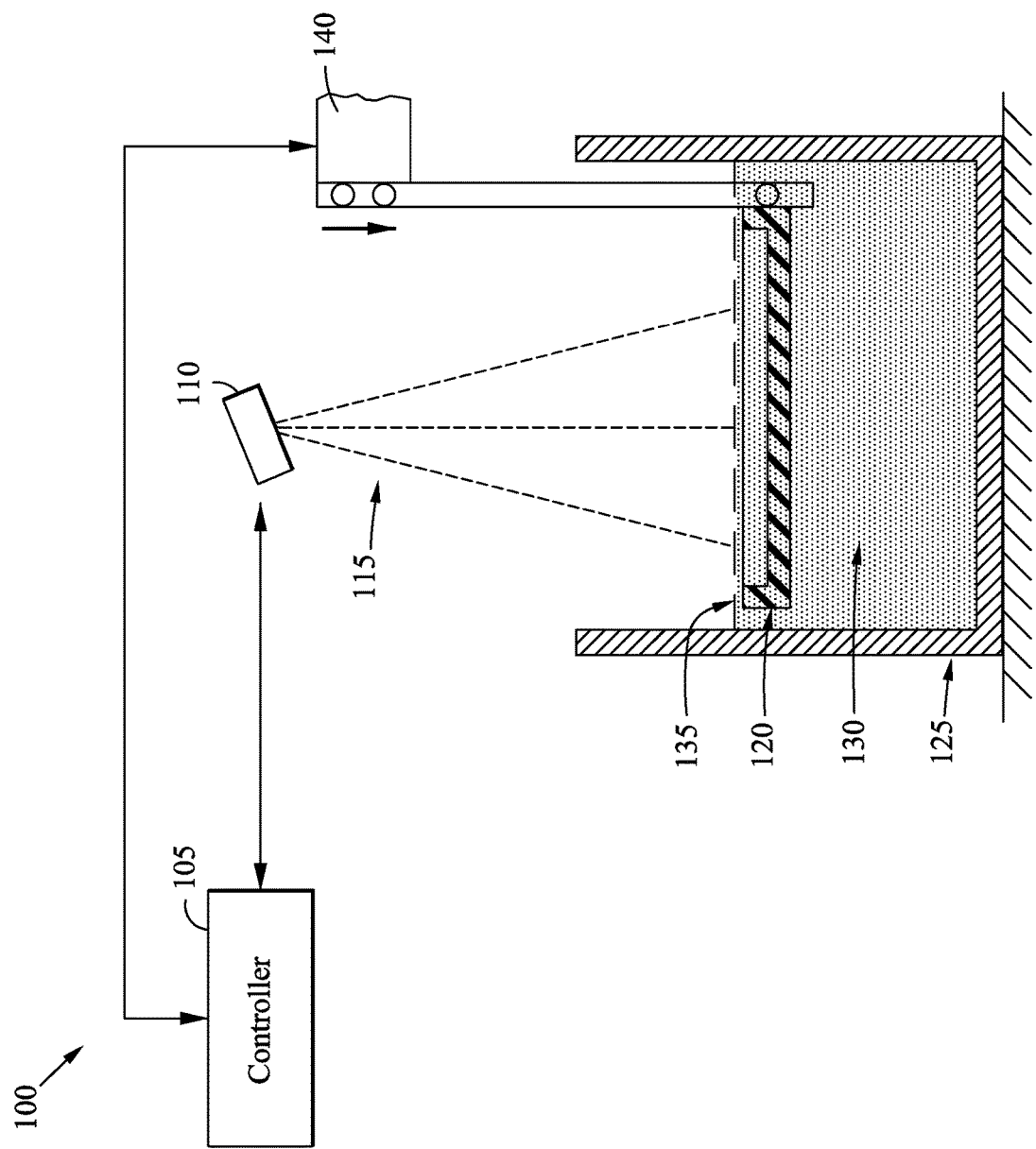
FIG. 1 depicts a simplified system diagram according to one or more embodiments.

One aspect of the disclosure relates to additive manufacturing, and in particular, to additive manufacturing using functionalized particles. One embodiment is directed to a resin including a preceramic polymer and functionalized particles. Other embodiments are directed to systems and methods for additive manufacturing with functionalized particles, such as functionalized inorganic particles. In an exemplary embodiment, silicon carbide (SiC) powder is functionalized (e.g., modified) such that the surface of the silicon carbide powder particles are functionalized with a chemical group that has the ability to convert to a non-oxide ceramic of choice and to interact selectively with an energy source. In that fashion, the functionalized surface of the particles can be cured or energized to react by laser light and thermally post processed to have a silicon carbide containing structure. Functionalization also includes adding a binding material to the powder. According to one embodiment, functionalization of the powder is a different step from buildup and curing of a structure.

In addition to functionalizing particles, another aspect is to provide a resin that will convert to a ceramic phase of choice.

As used herein, ceramic phase relates to a solid state and structure having homogeneous physical and chemical characteristics.

Preceramic polymer relates to a pre-cursor for the fabrication of silicon based ceramic.

Inorganic ceramic filler particles are particles or powders. The inorganic ceramic filler particles can be dry or in suspension with the resin.

Reactive group elements relate to surface components configured to provide binding of silicon based ceramic particles.

Photosensitive group elements relate to surface components configured to provide binding of silicon based ceramic particles and which are cured by a photo source.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a simplified system diagram of system 100 according to one or more embodiments. System 100 may be configured for additive manufacturing of ceramics using a curable resin. By way of example, system 100 may employ functional inorganics to produce ceramics using a laser scanning process, such as stereolithography (SLA) or alternately using light emitting diodes (LEDS) or lasers in digital light processing (DLP). System 100 includes controller 105, energy source 110, platform 120, and bath 125.

Controller 105 is coupled to energy source 110 and configured to control application of the energy source 110 to the resin 130 to create at least one layer of the ceramic phase from the resin. Application of energy source 110 includes generation of laser, shown as energy source beam 115, which may be employed to form a layer of the ceramic phase in order to generate three-dimensional structures. Energy source 110 may be a laser source for curing or reactively bonding at least one of the preceramic polymer and ceramic filler particles. Energy source 110 may be one or more of a light (e.g., photo), ultraviolet (UV), infrared (IR), e-beam source or other available regions of the electromagnetic spectrum. System 100 may include the use of multiple beams or more than one energy source. For example, in certain embodiments, system 100 may include one or more energy sources to provide different energies to interact with the resin. Energy source 110 may be positioned proximate to the bath 125 and resin 130, such as above and/or near the resin 130, for application of at least one of a beam and the source to resin 130.

Platform 120 may be adjusted by elevator 140 to position one or more formed layers relative to energy source 110. The position of platform 120 may be controlled by controller 105.

Bath 125 is configured to contain and/or hold a resin 130, such as a curable resin, including a preceramic polymer and inorganic ceramic filler particles dispersed in the preceramic polymer. In one embodiment, the ceramic filler particles are functionalized with a photosensitive group. In another embodiment, the preceramic resin is functionalized with a reactive group. According to another embodiment, catalysts can be used to enhance the curing or reactivity of the functional group. Resin 130 is provided in a bath 125 for additive manufacturing. In one embodiment, resin 130 is a liquid suspension. According to another embodiment, resin 130 is a slurry of inorganics. Resin 130 can include inorganic ceramic filler particles that include functional groups configured to decompose and a ceramic phase, wherein the ceramic phase remains during fabrication of the three-dimensional structure. According to another embodiment, resin 130 is a nanofluid.

In one embodiment, system 100 is configured to build three dimensional ceramic structures, such as silicon carbide structures. As such, the preceramic and ceramic phase may be selected to generate silicon carbide. To that end, in one embodiment, the preceramic polymer is polycarbosilane and the ceramic phase is silicon carbide. The resin 130 may be configured at a molecular level to convert to a ceramic phase, or other phase of choice, such as ceramic phases suitable for high temperature applications. For example, to create a silicon carbide part, system 100 can employ a preceramic polymer that thermally converts to silicon carbide, such as a polycarbosilane or modified polycarbosilane. In one embodiment, resin 130 would be slurry filled with ceramic filler particles that are uniformly dispersed in the resin 130. By way of example, a silicon carbide particle is chemically functionalized with a reactive group, such as a photo-sensitive group that can also convert to a desirable ceramic phase such as SiC. The functionalized SiC particles would be created in slurry form and energy source 110, which may be a laser-based SLA-type system, is configured to cure the slurry layer-by-layer so that a three-dimensional solid would be constructed. Upon removal of unsolidified resin or slurry, the 'green ceramic body' could be further post-processed by exposure to one or more of thermal, plasma, microwave, and other radiative methods.

When excited by energy source 110 and energy source beam 115, the polycarbosilane component of resin, such as resin 130, may form an amorphous, partially crystalline or crystalline structure of silicon carbide. Application of energy source 110 to the resin 130 includes free form fabrication of a three-dimensional article formed of silicon carbide. In one embodiment, application of laser beam 115 to resin 130, and in particular resin surface 135, at least partially converts the preceramic polymer and ceramic filler particles to a ceramic phase, such as silicon carbide.

According to one embodiment, structures formed by system 100 may be further processed by at least one of thermal, plasma, microwave and radiative exposure, and curing methods in general.

Although the discussion of system 100 refers to silicon carbide, it should be appreciated that other inorganics and ceramic polymers may be employed by the system for additive manufacturing.

System 100 may be configured to build and fabrication dense, monolithic ceramic parts for high temperature turbine applications. System 100 may additionally allow for fabrication of complex geometries from hard and brittle materials by additive manufacturing. In addition, system 100 may allow for direct fabrication of engineering ceramics using resin-based additive manufacturing methods including direct fabrication of engineering ceramics useful for turbine components.

Figure 2:
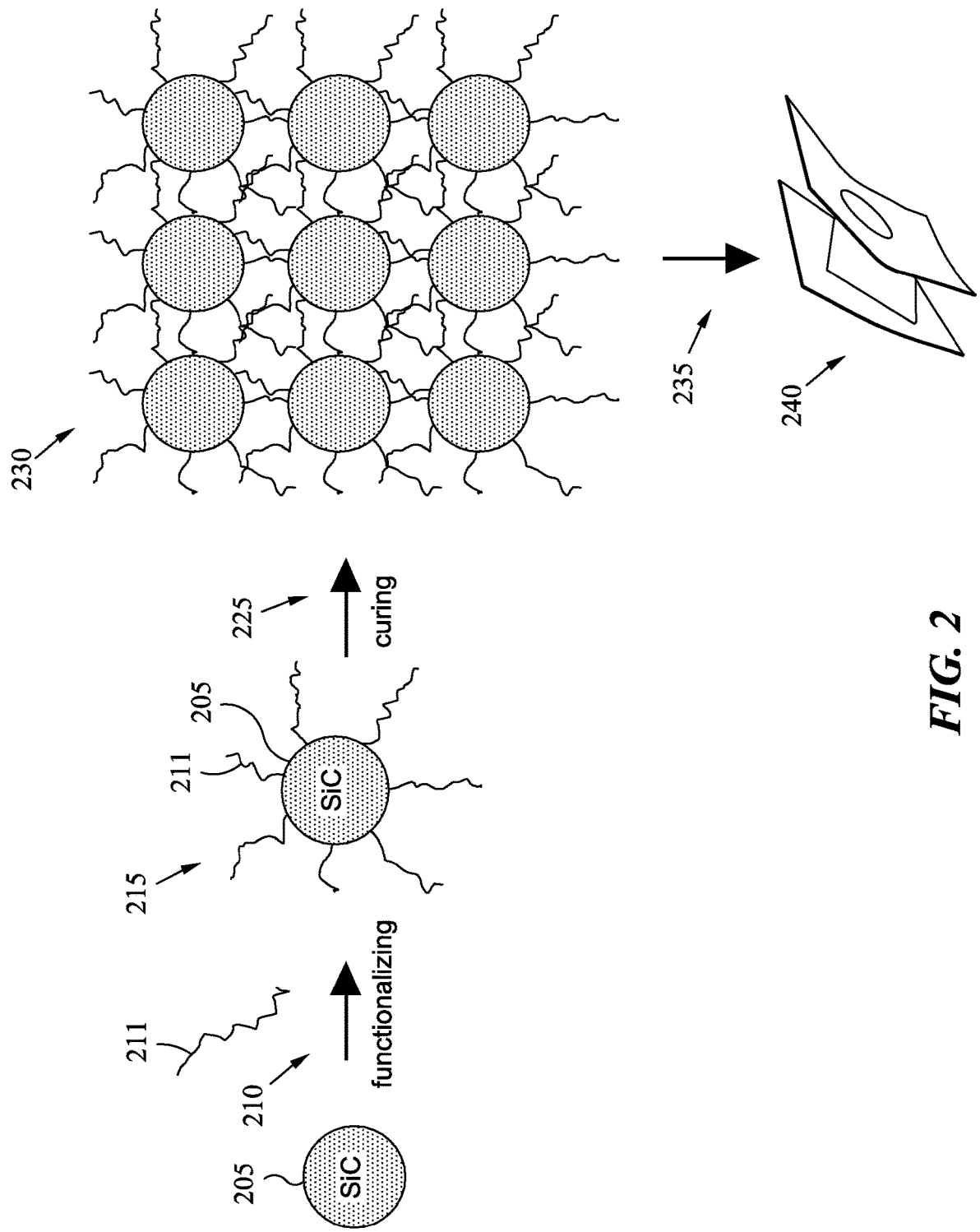
FIG. 2 depicts a graphical representation of particle functionalizing according to one or more embodiments.

FIG. 2 depicts a graphical representation of particle functionalizing according to one or more embodiments. According to one embodiment, inorganic particles may be functionalized prior to addition to a resin (e.g., resin 130). FIG. 2 depicts an inorganic particle 205, which may be silicon carbide. Particle 205 and additional inorganic particles are functionalized shown as 210, with reactive group elements, such as photosensitive group elements shown as 211. Functionalized particle 215 is shown including particle 205 and a plurality of photosensitive group elements 211. Functionalized particles may be distributed and dispersed in a preceramic polymer, such as a polycarbosilane liquid. Functionalized particle 215 may be a functionalized inorganic particle. According to one embodiment, the extent and composition of functionality can be tailored. In certain embodiments, functionalized particle 215 may be formed of functional groups that intentionally decompose to leave behind desirable ceramic phases, such as silicon carbide.

According to one or more embodiments, exemplary reactive group elements for functionalizing may include one or more of silyl, halo, haloformyl, hydroxyl, alkyl, alkenyl, alkynl, carboxamido, carbonyl, oxo, amino, azo, benzyl, amido, carboxyl, cyanato, imino, keto, nitro, peroxy, phenyl, phosphate, phosphoro, sulfonyl and sulfo, as well as short chain structures containing one or more such functional groups. According to one or more embodiments, exemplary photosensitive group elements include aryl azides, halogenated aryl azides, azoquinones, cinnamoyl groups, benzophenones and, anthroquinones. According to one or more other embodiments, particles, such as particle 205, may be between 100 nanometers and 250 microns in average diameter. In other embodiments, particles, such as particle 205, may be between 200 nanometers and 100 microns in average diameter. In yet another embodiment, particles, such as particle 205, may be between 500 nanometers and 50 microns in average diameter. Particle size distributions particle 205 can be mono-, bi- or multi-modal. According to one embodiment, functionalization of particles, such as particle 205, converts relatively unreactive, benign surface of the starting particle to that of a reactive, convertible surface. According to one embodiment, the functionalized particle 215 may be cured or reacted together, shown by 225 to form a layer 230. Layer 230 may be a cured network layer of functionalized silicon carbide ceramic particles, as would be found in a single build layer of a 3-D volumetric build. Functional groups are bonded to other functional groups or particles and may have partially converted to ceramic phase(s).

One or more additional layers may be formed to layer 230 for additive manufacturing or buildup, shown as 235 to form a three-dimensional object 240. Build up 235 may be an iterative build up of layers via stereolithography or digital light processing. Three-dimensional object 240 represents a silicon carbide ceramic structure from functionalized particle 215 and resin (e.g., resin 130). Three-dimensional object 240 may be post processed and/or machined following a build process.

According to one embodiment, inorganic particles may be functionalized and dispersed in a resin for additive manufacturing. FIG. 2 depicts silicon carbide as an exemplary inorganic particle. However, it should be appreciated that one or more other types of particles may be employed, including but not limited to oxides, non-oxides, carbides, nitrides, oxycarbides, oxynitrides, borides, phosphides, etc. Although the description of FIG. 2 relates to silicon carbide, the systems and methods described herein may employ exemplary inorganics such as one or more of SiC, $Si_3N_4$, $B_4C$, SiCN, SiOC, HfC, AlN, BN, $ZrO_2$, $SiO_2$, $HfO_2$, $Al_2O_3$, $B_2O_3$, yttrium silicate and disilicate, and the like, and may relate to mixtures thereof.

FIG. 3 depicts a process for additive manufacturing according to one or more embodiments. Process 300 may be initiated at block 305 with providing a resin (e.g., resin 130) with functionalized particles (e.g., functionalized particle 215). The resin is provided to include a preceramic polymer and inorganic ceramic filler particles dispersed in the preceramic polymer. The preceramic polymer is configured to convert to a ceramic phase, such as silicon carbide. In one embodiment, the preceramic polymer of FIG. 3 is polycarbosilane. Polycarbosilanes and modified polycarbosilanes may be characterized as having a structural backbone including silicon-carbon and can produce silicon carbide on pyrolysis or controlled decomposition. Similarly, polysiloxanes may be characterized by a silicon-oxygen backbone and produce silicon oxycarbides on pyrolysis.

The inorganic ceramic filler particles are functionalized with a reactive group, such as inorganic ceramic filler particles 215 and configured to convert to the ceramic phase. The inorganic ceramic filler particles include functional groups configured to decompose and a ceramic phase, wherein the ceramic phase remains during fabrication. In one embodiment, the functionalized particles are uniformly dispersed in the resin. The resin may be provided in a bath for additive manufacturing.

At block 310, one or more layers may be formed/built by applying an energy source to the resin to create at least one layer of the ceramic phase from the resin. Applying an energy source to the resin includes free form fabrication of a three-dimensional article formed of silicon carbide. The energy source may be a laser source for curing at least one of the preceramic polymer and ceramic filler particles. By way of example, a "green body" may be formed at block 310.

For example, if silicon carbide is the desired ceramic phase, polycarbosilane may be employed as the preceramic polymer. Polycarbosilane is a liquid polymer with silicon carbon binding, the addition of heat will convert the polymer to silicon carbide with extensive shrinkage, but ultimately can produce amorphous, partially crystalline or fully crystalline silicon carbide. According to one embodiment, a resin or resin slurry can be provided by combining a preceramic polymer and functionalizing of silicon carbide powder. One layer of the resin or resin slurry may be provided with a laser or energy beam of an energy source to draw the structure of choice. Another layer of resin would then be provided, followed by repeated exposure to an energy source. In this manner, a three-dimensional structure containing resin, which may be partially converted to ceramic, and functionalized silicon carbide filler would be constructed. This structure then has the ability to be processed by heat later on to create more silicon carbon structure. Thus, silicon carbide powder in a matrix of silicon carbide are created by the polymer. The polymer, which may be cured resin plus silicon carbide filler, is part of the build up.

At block 315, the formed structure may be cured or reacted. Curing or reaction may include heating and/or applying pressure to a formed article. Curing or reaction may include exposing a formed article to a particular atmosphere composition. As a result of the curing, articles may be hardened and/or shrink.

Process 300 may optionally include post-processing of the formed structure at block 320. Processing at block 320 may include one or more of the an article formed by the layer and one or more additional layers by at least one of thermal, plasma, microwave, exposure to another electromagnetic energy source, and radiative curing, and curing methods in general. Anything not cured could be removed. In addition, post processing of the article with heat would create more silicon carbide from the structure. After heat treating, articles may be post processed by importing more resin into any voids of the 3D structure.

FIG. 4 depicts a process for providing functionalized particles according to one or more embodiments. According to one embodiment, a resin is based on curable preceramic polymer, wherein the resin is curable by one or more of a light (e.g., photo), UV, IR, e-beam or other energy source. Process 400 depicts a process for providing a resin. In one embodiment, process 400 is initiated at block 405 with receiving inorganic particles, such as an inorganic powder. Process 400 includes bonding reactive group elements to the inorganic particles at block 410. For example, inorganic ceramic filler particles are functionalized at block 410 with a photosensitive group. The reactive group elements and/or the inorganic ceramic filler particles are configured to convert to the ceramic phase, such as silicon carbide.

Functionalizing allows for a binder to be introduced with inorganic particles. With respect to silicon carbide powder, the particles will have silicon carbon bonding. According to one embodiment, another silicon containing species, such as silane-based coupling agent, may be chemically bonded to the silicon carbide powder. The bonding functionalizes the surface of the particles including a reactive or photoactive functional group, which in turn produces a modified powder. The powder can be dispersed into a fluid that is either reactive, photochemically sensitive, or also contains that ability to convert to silicon carbide. Although the discussion herein may refer to silicon carbide, other pre-ceramic polymer materials may be employed. Resins and other preceramic polymers may be chosen to make silicon carbide, silicon nitride, silicon carbide nitride, and silicon oxycarbide as the primary resins. In certain embodiments, derivatives of the polymers may be modified with boron or aluminum to provide additional properties. Functionalization of the powder is a different step than buildup and curing. In addition to functionalizing the material, resin is selected to convert to a ceramic of choice.

Process 400 may optionally include suspending the functionalized inorganic particles in the resin at block 415. Suspension of the functionalized particles at block 415 may include uniform distribution of the particles into a preceramic polymer that is configured to convert to a ceramic phase, such as polycarbosilane.

While this disclosure has been particularly shown and described with references to exemplary embodiments thereof, it will be understood by those skilled in the art that various changes in form and details may be made therein without departing from the scope of the claimed embodiments.

What is claimed is:

1. A method for additive manufacturing of a ceramic structure, the method comprising:
providing a first layer of resin, the resin comprising a preceramic polymer and a plurality of first inorganic filler particles dispersed in the preceramic polymer wherein the first inorganic filler particles have functional groups that are configured to convert to a ceramic phase and wherein the preceramic polymer is configured to convert to the ceramic phase;
applying an energy source to the first layer of resin to create a first ceramic layer;
disposing a second layer of resin at least partially on the first ceramic layer, the second layer of resin comprising the preceramic polymer and a plurality of second inorganic filler particles dispersed in the preceramic polymer, wherein the second inorganic filler particles have functional groups that are configured to convert to a ceramic phase and wherein the preceramic polymer is configured to convert to the ceramic phase;
applying an energy source to the second layer of resin to create a second ceramic layer, wherein the second ceramic layer has a different composition, crystallinity or both compared to the first ceramic layer.

2. The method of claim 1, wherein the functional groups on the first inorganic filler particles are different from the functional groups on the second inorganic filler particles.

3. The method of claim 1, wherein the first inorganic filler particles have a different amount of functional groups than the second inorganic filler particles.

4. The method of claim 1, wherein the energy source applied to the first layer of resin is different from the energy source applied to the second layer of resin.

5. The method of claim 1, wherein the second ceramic layer has a different crystallinity than the first ceramic layer.

6. The method of claim 1, wherein the second ceramic layer has a different composition than the first ceramic layer.

7. The method of claim 1, wherein the first inorganic filler particles have a different functional group than the second inorganic filler particles.

8. The method of claim 1, further comprising exposing the first and second ceramic layers to thermal, plasma, microwave, or radiative post processing.

9. The method of claim 1, wherein the first and second ceramic layers comprise silicon carbide.

10. The method of claim 1, wherein the functional groups on the first inorganic filler particles comprise one or more of silyl, halo, haloformyl, hydroxyl, alkyl, alkenyl, alkynl, carboxamido, carbonyl, oxo, amino, azo, benzyl, amido, carboxyl, cyanato, imino, keto, nitro, peroxy, phenyl, phosphate, phosphoro, sulfonyl, and sulfo.

11. The method of claim 1, wherein the functional groups on the second inorganic filler particles comprise one or more of silyl, halo, haloformyl, hydroxyl, alkyl, alkenyl, alkynl, carboxamido, carbonyl, oxo, amino, azo, benzyl, amido, carboxyl, cyanato, imino, keto, nitro, peroxy, phenyl, phosphate, phosphoro, sulfonyl, and sulfo.

12. The method of claim 1, wherein the functional groups on the first inorganic filler particles comprise one or more of aryl azides, halogenated aryl azides, azaquinones, cinnamoyl groups, benzophenones and anthraquinones.

13. A ceramic structure comprising a first ceramic layer comprising first inorganic filler particles dispersed within the first ceramic layer and bound to the first ceramic layer and and a second ceramic layer at least partially disposed on the first ceramic layer, wherein the second ceramic layer has a different composition, crystallinity or both compared to the first ceramic layer.

14. The ceramic structure of claim 13, further comprising a third ceramic layer wherein the second ceramic layer is intermediate in composition relative to the first ceramic layer and the third ceramic layer.

15. The ceramic structure of claim 13, further comprising a third ceramic layer wherein the second ceramic layer is intermediate in crystallinity relative to the first ceramic layer and the third ceramic layer.

16. The ceramic structure of claim 13, wherein the first ceramic layer has a different composition than the second ceramic layer.

17. The ceramic structure of claim 13, wherein the first ceramic layer has different crystallinity than the second ceramic layer.

18. The ceramic structure of claim 13, wherein the first and second ceramic layers comprise silicon carbide.

19. A ceramic structure produced by the method of claim 1.

* * * * *